United States Patent
Anglin et al.

(10) Patent No.: US 9,926,851 B2
(45) Date of Patent: Mar. 27, 2018

(54) TORSION SPRING INTERNAL DAMPER

(71) Applicant: United Technologies Corporation, Hartford, CT (US)

(72) Inventors: Christopher T. Anglin, Manchester, CT (US); Leslie Charles Kurz, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 359 days.

(21) Appl. No.: 14/639,220

(22) Filed: Mar. 5, 2015

(65) Prior Publication Data
US 2015/0292415 A1 Oct. 15, 2015

Related U.S. Application Data

(60) Provisional application No. 61/977,685, filed on Apr. 10, 2014.

(51) Int. Cl.
| | |
|---|---|
| *F02C 7/36* | (2006.01) |
| *F02C 7/275* | (2006.01) |
| *F01D 25/04* | (2006.01) |
| *F02C 3/04* | (2006.01) |
| *F16F 3/00* | (2006.01) |

(Continued)

(52) U.S. Cl.
CPC ............... *F02C 7/36* (2013.01); *F01D 25/04* (2013.01); *F02C 3/04* (2013.01); *F02C 7/275* (2013.01); *F16F 1/042* (2013.01); *F16F 1/046* (2013.01); *F16F 3/00* (2013.01); *F16F 15/1216* (2013.01); *F05D 2250/70* (2013.01); *F05D 2260/38* (2013.01); *F05D 2260/403* (2013.01); *F05D 2260/52* (2013.01); *F05D 2260/96* (2013.01);

(Continued)

(58) Field of Classification Search
CPC .... F02C 3/04; F02C 7/275; F02C 7/36; F01D 25/04; F16F 15/1216; F16F 1/046; F16F 1/06; F16F 1/126; F16F 1/14; F16F 3/06; F16F 3/12; F16F 13/02; F16D 7/022; F16D 41/12; F16D 41/30; F16D 43/02; F16D 43/04; F16D 43/20; F16D 43/202; F16D 43/2028; F16D 43/22; F16D 43/24
USPC .............................. 415/122.1, 123; 192/43.1
See application file for complete search history.

(56) References Cited

U.S. PATENT DOCUMENTS

| | | | | |
|---|---|---|---|---|
| 1,767,593 | A * | 6/1930 | Laabs | F16D 41/12 192/42 |
| 1,952,102 | A * | 3/1934 | Sproul | F16F 13/02 213/29 |

(Continued)

OTHER PUBLICATIONS

European Search Report for European Application No. 15162127.3 dated Sep. 16, 2015.

*Primary Examiner* — Woody Lee, Jr.
*Assistant Examiner* — Sang K Kim
(74) *Attorney, Agent, or Firm* — Carlson, Gaskey & Olds, P.C.

(57) ABSTRACT

A spring assembly has a spring end for engagement with a component to bias the component in a first direction. The spring end is connected to a plurality of coils, which have an inner peripheral surface, and are mounted about a pivot pin. A damper is positioned between an outer peripheral surface on the pivot pin and the inner peripheral surface of the spring coils. The damper is engaged by the spring coils, if the spring end is driven in a direction opposed to the first direction. A one-way drive assembly and a gas turbine engine are also disclosed.

16 Claims, 3 Drawing Sheets

(51) Int. Cl.
*F16F 15/121* (2006.01)
*F16F 1/04* (2006.01)
*F16D 41/12* (2006.01)

(52) U.S. Cl.
CPC ........ *F05D 2300/501* (2013.01); *F16D 41/12* (2013.01)

(56) References Cited

U.S. PATENT DOCUMENTS

| | | | |
|---|---|---|---|
| 2,086,321 A * | 7/1937 | Hiojiro | F16F 1/042 267/180 |
| 2,466,087 A * | 4/1949 | Endsley | F16F 1/04 267/204 |
| 2,821,971 A * | 2/1958 | Benz | F01L 1/462 123/90.66 |
| 2,976,959 A * | 3/1961 | Husted | B65H 75/4434 123/185.14 |
| 4,128,152 A | 12/1978 | Tschursch | |
| 4,479,461 A | 10/1984 | Felice et al. | |
| 4,509,473 A * | 4/1985 | Hamparian | F01L 1/462 123/188.17 |
| 4,538,563 A | 9/1985 | Mayers | |
| 4,726,574 A | 2/1988 | Idigkelt et al. | |
| 4,779,854 A | 10/1988 | Idigkeit et al. | |
| 5,259,599 A | 11/1993 | Hernandez | |
| 5,464,197 A * | 11/1995 | Ecclesfield | F16F 1/041 267/155 |
| 5,713,442 A | 2/1998 | Murata et al. | |
| 5,769,722 A | 6/1998 | Uehara | |
| 5,906,362 A | 5/1999 | Takehira | |
| 6,041,905 A | 3/2000 | Fujimoto et al. | |
| 6,461,243 B1 | 10/2002 | Uehara | |
| 6,494,435 B1 * | 12/2002 | Cauchon | B60P 7/083 254/213 |
| 6,752,406 B2 * | 6/2004 | Pierce | B60G 9/003 280/124.162 |
| 6,789,790 B2 | 9/2004 | Speckhart et al. | |
| 2008/0196844 A1 | 8/2008 | Diaz | |
| 2011/0140370 A1 | 6/2011 | Sutcu | |
| 2012/0111686 A1 | 5/2012 | Peterson | |

* cited by examiner

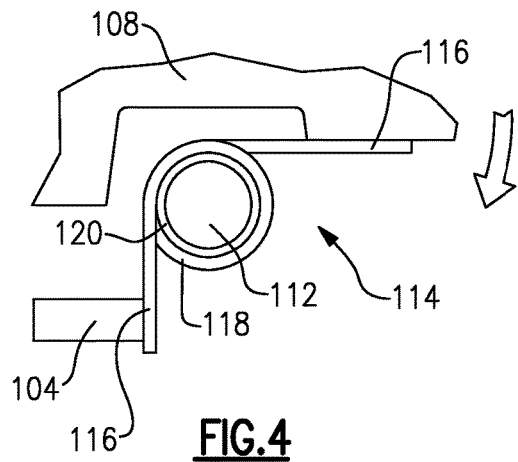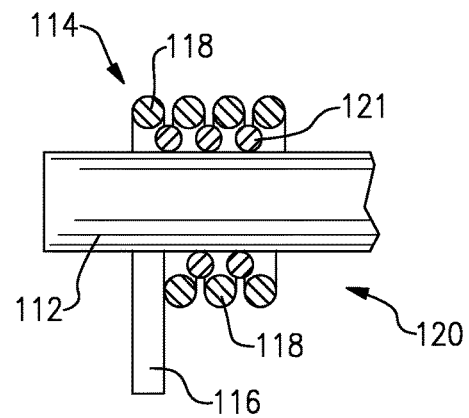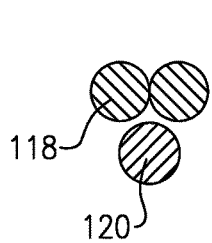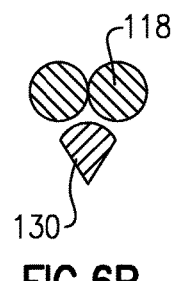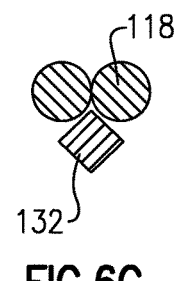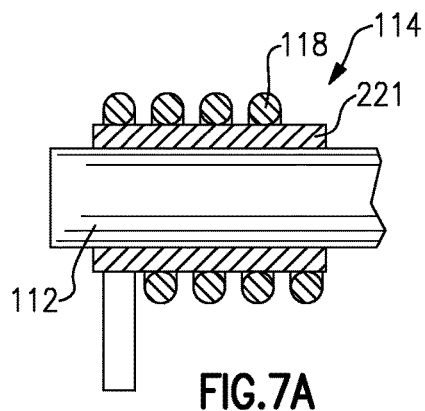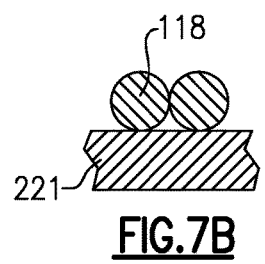

TORSION SPRING INTERNAL DAMPER

CROSS-REFERENCE TO RELATED APPLICATION

This application claims priority to U.S. Provisional Patent Application No. 61/977,685, filed Apr. 10, 2014.

BACKGROUND OF THE INVENTION

This application relates to a spring that is provided with a damper to reduce bouncing.

Gas turbine engines are known and, typically, include a fan delivering air into a compressor. The air is compressed in the compressor and delivered into a combustion section where it is mixed with fuel and ignited. Products of this combustion pass downstream over turbine rotors driving them to rotate.

The turbine rotors are provided with bearings. One challenge with gas turbine engines is called "windmilling." Windmilling may occur when the engine is shut down, but air is driven across the fan rotor. The fan rotor may rotate in a reverse direction than is typical for the engine and, in turn, drive a fan drive turbine shaft. This can be detrimental to the bearings.

Thus, it has been proposed to provide a ratchet, counterweight and pawl system which prevents reverse rotation of the shaft. Typically, a pawl is biased outwardly into engagement with a ratchet and such that the shaft will not rotate in the reverse direction. The pawls will not engage when the shaft is driven in the proper direction, but will slide along the ratchets.

At start-up, the pawl is provided with a counterweight that will move the pawl out of engagement once the engine reaches a particular speed. Until the counterweight moves the pawl out of engagement, there is movement of the pawl along the ratchets as the engine is driven in the desired direction.

There can be a bouncing mode that is undesirable during this movement.

SUMMARY OF THE INVENTION

In a featured embodiment, a spring assembly has a spring end for engagement with a component to bias the component in a first direction. The spring end is connected to a plurality of coils, which have an inner peripheral surface, and are mounted about a pivot pin. A damper is positioned between an outer peripheral surface on the pivot pin and the inner peripheral surface of the spring coils. The damper is engaged by the spring coils, if the spring end is driven in a direction opposed to the first direction.

In another embodiment according to the previous embodiment, the damper has a plurality of coils.

In another embodiment according to any of the previous embodiments, the damper coils are generally cylindrical in cross-section.

In another embodiment according to any of the previous embodiments, the damper coils have a part-circular shape.

In another embodiment according to any of the previous embodiments, the damper coils have a generally diamond shape.

In another embodiment according to any of the previous embodiments, the damper is formed of at least one of a polymer or an elastomer.

In another embodiment according to any of the previous embodiments, the damper coils are closely received between the outer peripheral surface of the pivot pin and the inner peripheral surface of the spring coils.

In another embodiment according to any of the previous embodiments, the damper is a cylindrical sleeve.

In another featured embodiment, a one-way drive assembly has at least one pawl with a counterweight on one side of a pivot pin and an engaging pawl end on an opposed side of the pivot pin. At least one pawl rotates with a shaft. A housing has a ratchet to receive the pawl end, and prevent rotation of the shaft in an undesired direction. A spring end engages with at least one pawl to bias at least one pawl in a first direction. The spring end is connected to a plurality of coils. The coils have an inner peripheral surface, and are mounted about a pivot pin. A damper is positioned between an outer peripheral surface on the pivot pin and the inner peripheral surface of the spring coils. The damper is engaged by the spring coils, if the spring end is driven in a direction opposed to the first direction.

In another embodiment according to the previous embodiment, the damper has a plurality of coils.

In another embodiment according to any of the previous embodiments, the damper coils are generally cylindrical in cross-section.

In another embodiment according to any of the previous embodiments, the damper coils have a part-circular portion shape.

In another embodiment according to any of the previous embodiments, the damper coils have a generally diamond shape.

In another embodiment according to any of the previous embodiments, the damper is formed of at least one of a polymer or an elastomer.

In another embodiment according to any of the previous embodiments, the damper coils are closely received between the outer periphery of the pivot pin and the inner periphery of the spring coils.

In another embodiment according to any of the previous embodiments, the damper is a cylindrical sleeve.

In another embodiment according to any of the previous embodiments, a gas turbine engine has a turbine driving a fan and a bearing for mounting a turbine shaft. The turbine has a one-way drive to prevent reverse rotation of a shaft leading into the turbine by the fan. At least one pawl has a counterweight on one side of a pivot pin and an engaging pawl end on an opposed side of the pivot pin. At least one pawl rotates with a shaft. A housing has a ratchet to receive the pawl end, and prevent rotation of the shaft in an undesired direction. A spring end engages with at least one pawl to bias at least one pawl in a first direction. The spring end is connected to a plurality of coils. The coils have an inner peripheral surface, and are mounted about a pivot pin. A damper is positioned between an outer peripheral surface on the pivot pin and the inner peripheral surface of the spring coils. The damper is engaged by the spring coils, if the spring end is driven in a direction opposed to the first direction.

In another embodiment according to the previous embodiment, the damper has a plurality of coils.

In another embodiment according to any of the previous embodiments, the damper coils are generally cylindrical in cross-section.

In another embodiment according to any of the previous embodiments, the damper coils have a part-circular portion shape.

In another embodiment according to any of the previous embodiments, the damper coils have a generally diamond shape.

In another embodiment according to any of the previous embodiments, the damper coils are closely received between the outer periphery of the pivot pin and the inner periphery of the spring coils.

In another embodiment according to any of the previous embodiments, the damper is formed of at least one of a polymer or an elastomer.

In another embodiment according to any of the previous embodiments, the damper is a cylindrical sleeve.

These and other features may be best understood from the following drawings and specification.

BRIEF DESCRIPTION OF THE DRAWINGS

FIG. 4 shows a spring and damper.
FIG. 5 is a cross-sectional view through the spring and damper.
FIG. 6A shows one embodiment of damper.
FIG. 6B shows a second embodiment.
FIG. 6C shows yet another embodiment.
FIG. 7A shows another embodiment.
FIG. 7B is a detail of the FIG. 7A embodiment.

DETAILED DESCRIPTION

Figure 1:
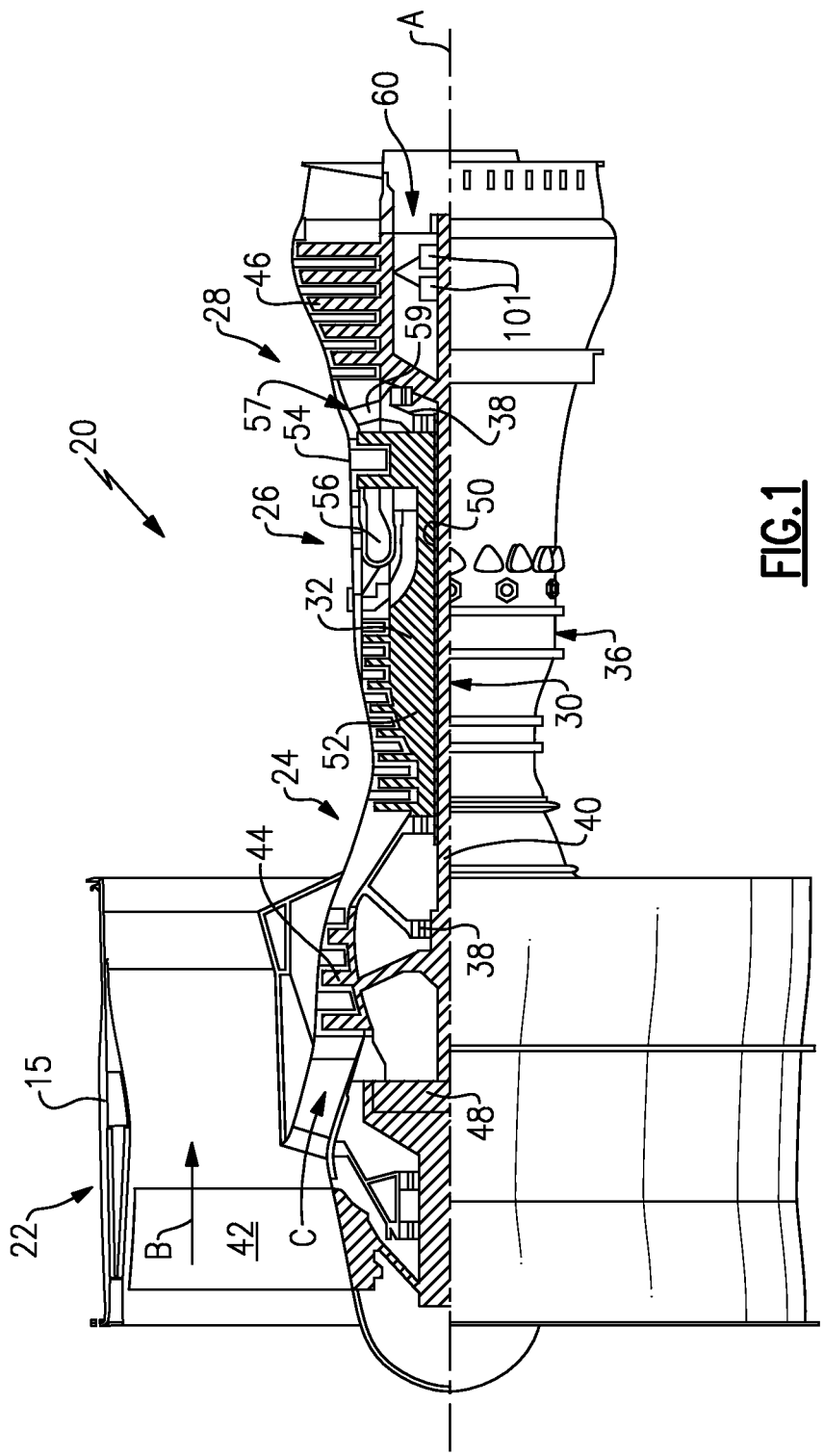
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

A bearing compartment 60 is shown schematically in FIG. 1 and supports bearings 101 for the fan drive or low pressure turbine 46. It should be understood that the teachings of this disclosure would extend to a three turbine rotor engine wherein a dedicated turbine rotor drives the fan, such as through gear reduction 48.

Figure 2:
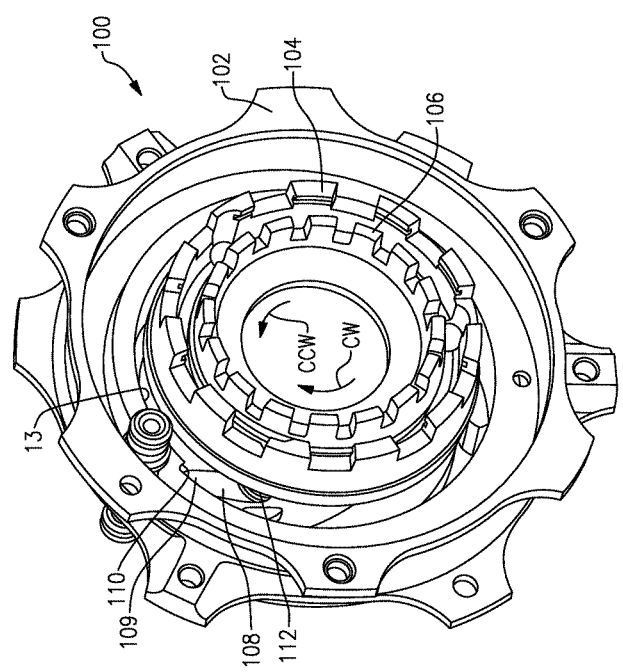
FIG. 2 shows ratchet and pawl hardware.

FIG. 2 shows a shaft assembly 100 incorporating a one-way drive assembly. A static housing 102 is secured within the engine and is static.

A shaft portion, or pawl carrier 104 rotates with the turbine and receives a central shaft 106, which is to be fixed to the turbine rotor 46 through a shaft.

A pawl 108 has an engaging end 109 engaged in a ratchet 110 in the housing 102. As will be described below, a spring drives the pawl end 109 into the ratchet 110, causing the pawl 108 to pivot about a pin 112. When in this position, if the fan windmills, engaged ends 109 prevent the shaft portion 104/106, and hence turbine 46, from turning. In FIG. 2, clockwise rotation (CW) is prevented, while counter-clockwise rotation (CCW) is allowed.

Figure 3:
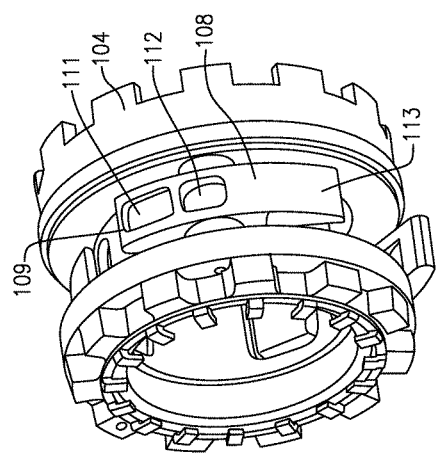
FIG. 3 shows a portion of the FIG. 2 structure.

As shown in FIG. 3, the pawl 108 includes a recess 111 at the engagement end 109. An opposed end 113 is heavier than the end 109. Thus, as the engine increases in speed, such as after start-up, the heavier weight end will eventually overcome the force of the spring, as described below, and such that the pawl 108 will pivot about the axis of the pin 112. The pawl end 109 is then removed from the ratchets 110 and such that the pawl end 109 and ratchets 110 no longer are in contact. During transition from the FIG. 2 locked position to the "removed" position, the ends 109 slide along the ratchets 110 and surface 13 (see FIG. 2).

FIG. 4 shows the spring 114 about the pin 112. The spring 114 is shown having spring ends 116 biasing the pawl 108 as described. As shown, one end 116 controls pawl carrier 104 while the other contacts pawl 108. In this position, the spring 114 is biasing the pawl 108 in a clockwise direction to hold the pawl end 109 in a ratchet 110.

The spring 114 includes coils 118. An interior damper 120 is positioned within the coils 118.

As shown in FIG. 5, the damper 120 may have its own coils 121 positioned within the coils 118 of the spring 114.

The damper is closely fitted to be received tightly between an outer periphery of the pin 112 and an inner periphery of the coils 118 of the spring 114. As the spring 114 is compressed, its inside diameter shrinks and the damper 120 is squeezed between the spring 114 and pin 112. Friction between the spring and damper and an internal hysteresis of the damper material damps motion of the spring. This protects pawl hardware and the ratchet surface from being damaging by a bouncing pawl.

The damper may be formed of an appropriate material, such as a polymer or elastomer and, in one embodiment, an oil-insensitive polymer or elastomer.

FIG. 6A shows the embodiment as illustrated above wherein the coils 120 of the damper material are generally cylindrical.

FIG. 6B shows an embodiment where the damper has coils of a generally pie slice, or part circular shape. FIG. 6C shows an embodiment where the damper may have a series of coils which are generally diamond shaped 132. Of course, other shapes may be used.

FIG. 7A shows a damper embodiment 221 that is generally a cylindrical sleeve or a cylindrical tube. The sleeve is closely received between the coils 118 and the pivot pins 112, as in the prior embodiment. As can be seen in FIGS. 7A and 7B, the sleeve 221 extends across a plurality of spring coils 118.

As disclosed, a one-way drive assembly includes at least one pawl 108 having a counterweight 113 on one side of a pivot pin 112 and an engaging pawl end 109 on an opposed side of pivot pins 112. The pawl rotates with a shaft 104/106. A housing 102 has a ratchet 110 to receive pawl end 109, and prevent rotation of shaft 104/106 in an undesired direction.

A spring end 116 engages a pawl 108 to bias the pawl 108 in a first direction and spring end 116 being connected to a plurality of coils 118. Coils 118 have an inner peripheral surface, and are mounted about pivot pins 112. A damper 120/221 is positioned between an outer peripheral surface on pivot pin 112 and the inner peripheral surface of spring coils 118. The damper 120/221 is engaged by spring coils 118, if spring end 116 is driven in a direction opposed to the first direction.

Although the damper material has been disclosed within a spring for a pawl in a gas turbine engine, it should be understood that it may be applied to other spring applications.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A one-way drive assembly comprising:
    at least one pawl with a counterweight on one side of a pivot pin and an engaging pawl end on an opposed side of said pivot pin;
    said at least one pawl rotating with a shaft, a housing having a ratchet to receive said pawl end, and prevent rotation of said shaft in an undesired direction;
    a spring end for engagement with said at least one pawl to bias said at least one pawl in a first direction and said spring end being connected to a plurality of coils, said coils having an inner peripheral surface, and said coils being mounted about said pivot pin;
    a damper positioned between an outer peripheral surface on said pivot pin and said inner peripheral surface of said spring coils, with said damper being engaged by said spring coils, if said spring end is driven in a direction opposed to said first direction; and
    when said spring end is driven in a direction opposed to said first direction, said plurality of coils is compressed, and an inner diameter of said plurality of coils shrinks and said damper is squeezed between said plurality of coils and said pin, to dampen motion of said plurality of coils.

2. The drive assembly as set forth in claim 1, wherein said damper has a plurality of damper coils.

3. The drive assembly as set forth in claim 2, wherein said damper coils are generally cylindrical in cross-section.

4. The drive assembly as set forth in claim 2, wherein said damper coils have a part-circular portion shape.

5. The drive assembly as set forth in claim 2, wherein said damper coils have a generally diamond shape in cross-section.

6. The drive assembly as set forth in claim 1, wherein said damper is formed of at least one of a polymer or an elastomer.

7. The drive assembly as set forth in claim 1, wherein said damper coils are closely received between said outer periphery of said pivot pin and said inner periphery of said spring coils.

8. The drive assembly as set forth in claim 1, wherein said damper is a cylindrical sleeve.

9. A gas turbine engine comprising:
    a turbine driving a fan and a bearing for mounting a turbine shaft, said turbine having a one-way drive to prevent reverse rotation of a shaft leading into said turbine by said fan;

at least one pawl with a counterweight on one side of a pivot pin and an engaging pawl end on an opposed side of said pivot pin;

said at least one pawl rotating with said shaft, a housing having a ratchet to receive said pawl end, and prevent rotation of said shaft in an undesired direction;

a spring end for engagement with said at least one pawl to bias said at least one pawl in a first direction and said spring end being connected to a plurality of coils, said coils having an inner peripheral surface, and said coils being mounted about said pivot pin;

a damper positioned between an outer peripheral surface on said pivot pin and said inner peripheral surface of said spring coils, with said damper being engaged by said spring coils, if said spring end is driven in a direction opposed to said first direction; and when said spring end is driven in a direction opposed to said first direction, said plurality of coils is compressed, and an inner diameter of said plurality of coils shrinks and said damper is squeezed between said plurality of coils and said pin, to dampen motion of said plurality of coils.

10. The gas turbine engine as set forth in claim 9, wherein said damper has a plurality of damper coils.

11. The gas turbine engine as set forth in claim 10, wherein said damper coils are generally cylindrical in cross-section.

12. The gas turbine engine as set forth in claim 10, wherein said damper coils have a part-circular portion shape.

13. The gas turbine engine as set forth in claim 10, wherein said damper coils have a generally diamond shape in cross-section.

14. The gas turbine engine as set forth in claim 9, wherein said damper is closely received between said outer periphery of said pivot pin and said inner periphery of said spring coils.

15. The gas turbine engine as set forth in claim 9, wherein said damper is formed of at least one of a polymer or an elastomer.

16. The gas turbine engine as set forth in claim 9, wherein said damper is a cylindrical sleeve.

* * * * *